(12) United States Patent
Hedman et al.

(10) Patent No.: US 8,752,442 B2
(45) Date of Patent: Jun. 17, 2014

(54) MULTI-CLUTCH TRANSMISSION FOR A MOTOR VEHICLE

(75) Inventors: Anders Hedman, Marstrand (SE); Lars Zettergren, Myggenäs (SE)

(73) Assignee: Volvo Lastvagner AB, Göteborg (SE)

( * ) Notice: Subject to any disclaimer, the term of this patent is extended or adjusted under 35 U.S.C. 154(b) by 213 days.

(21) Appl. No.: 13/514,609

(22) PCT Filed: Dec. 11, 2009

(86) PCT No.: PCT/EP2009/008878
§ 371 (c)(1),
(2), (4) Date: Aug. 22, 2012

(87) PCT Pub. No.: WO2011/069530
PCT Pub. Date: Jun. 16, 2011

(65) Prior Publication Data
US 2013/0133450 A1    May 30, 2013

(51) Int. Cl.
*F16H 3/08*    (2006.01)
*F16H 59/00*   (2006.01)

(52) U.S. Cl.
USPC .............................. 74/330; 74/335

(58) Field of Classification Search
USPC .................. 74/330, 333, 335, 340
See application file for complete search history.

(56) References Cited

U.S. PATENT DOCUMENTS

| 2,991,661 | A | | 7/1961 | Rambausek | |
|---|---|---|---|---|---|
| 3,309,934 | A | | 3/1967 | Gustafsson et al. | |
| 3,834,499 | A | * | 9/1974 | Candellero et al. | 477/73 |
| 4,192,196 | A | * | 3/1980 | Bogema et al. | 74/339 |
| 4,361,060 | A | * | 11/1982 | Smyth | 477/78 |
| 4,519,484 | A | * | 5/1985 | Nagaoka et al. | 192/3.58 |
| 4,527,447 | A | * | 7/1985 | Richards | 477/78 |
| 4,727,764 | A | | 3/1988 | Klaue | |
| 6,958,028 | B2 | | 10/2005 | Janson et al. | |
| 7,000,748 | B2 | | 2/2006 | Hornbrook et al. | |

(Continued)

FOREIGN PATENT DOCUMENTS

| DE | 923402 | | 7/1949 |
|---|---|---|---|
| DE | 3131156 | A1 | 2/1983 |

(Continued)

OTHER PUBLICATIONS

International Search Report for corresponding International Application No. PCT/EP2009/008878, Date of mailing search report: Sep. 6, 2010.

(Continued)

*Primary Examiner* — Ha D Ho
(74) *Attorney, Agent, or Firm* — WRB-IP LLP (57) ABSTRACT

A multi-clutch power shift transmission for a motor vehicle with at least one prime mover is provided, where a shaft brake unit is arranged to reduce the rotational speed of one of two input shafts, and a central synchronizing unit is arranged to make a first of the input shafts rotate faster or slower than a second of the input shafts. The shaft brake unit and the central synchronizing unit are arranged to be simultaneously activated in order to reduce rotating speeds prior to the engagement of tooth clutches when the output shaft is not rotating. The input shaft brake unit is arranged to be used when performing a multi-step power shift.

21 Claims, 3 Drawing Sheets

(56) References Cited

U.S. PATENT DOCUMENTS

| | | |
|---|---|---|
| 2003/0168300 A1 | 9/2003 | Voit |
| 2008/0188342 A1 | 8/2008 | Jackson |
| 2008/0190228 A1 | 8/2008 | Long et al. |

FOREIGN PATENT DOCUMENTS

| | | |
|---|---|---|
| DE | 3739898 A1 | 6/1989 |
| DE | 4122628 A1 | 1/1993 |
| DE | 4226577 C1 | 2/1994 |
| DE | 19652916 A1 | 6/1998 |
| EP | 0278938 A1 | 8/1988 |
| GB | 2110324 A | 6/1983 |
| SE | 527267 C2 | 1/2006 |
| WO | 03083325 A1 | 10/2003 |
| WO | 2004069621 A1 | 8/2004 |
| WO | 2008094122 A1 | 8/2008 |
| WO | 2008105728 A1 | 9/2008 |

OTHER PUBLICATIONS

International Preliminary Report on Patentability for corresponding International Application No. PCT/EP2009/008878, Date of completion report: Mar. 20, 2012.

* cited by examiner

MULTI-CLUTCH TRANSMISSION FOR A MOTOR VEHICLE

BACKGROUND AND SUMMARY

The present invention relates to vehicle transmissions, especially for heavy, on- and off-road vehicles, and more particularly to dual- and multi-clutch transmissions according to the preamble of the independent claim.

Dual clutch transmissions are a cross-breed between conventional stepped transmissions, with power interruption at gear shifts, and powershifting, without power interruption, planetary transmissions. In principle, a dual clutch transmission has two input shafts, each connectable to a friction clutch and to the output of the engine. Functionally, this is equivalent to having two conventional transmissions in parallel, i.e., two parallel sub-transmissions, and using one at a time for power transfer. The sub-transmission that is not used, idling, for the time being, can have a gear engaged and prepared, preselected, for a subsequent shift. This shift is carried out by simultaneously disengaging the friction clutch of the previously used sub-transmission and engaging the friction clutch of the previously idling sub-transmission.

When properly designed, dual clutch transmissions have the potential of providing powershifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions often have two separate countershafts, one connected to each input shaft. One example is U.S. Pat. No. 4,876,907. These countershafts make the transmission considerably wider than a conventional stepped transmission. That may lead to difficulties in installing the transmission into the vehicle. However, some dual clutch transmission designs have only one countershaft, e.g., as in DE923402 and DE3131156A1. Loose gearwheels are arranged rotatably thereon and can be rota-tionally connected to each other and to the countershaft by mechanical tooth clutches. In a way, this could be seen as if the second countershaft is arranged coaxial to the first one. The result is a very compact powershiftable dual clutch transmission that is not wider than a corresponding conventional stepped transmission.

Normally, in a dual clutch transmission, gears are preselected in the presently idling sub-transmission by engaging and disengaging tooth clutches. For a smooth and durable operation, this requires that the parts to be engaged by a tooth clutch are synchronized, i.e., that they have fairly equal rotational speed. If not, the clutch teeth would clash, resulting in worn, or broken, teeth and noise. So, different kinds of devices and arrangements are used for synchronizing parts to be engaged. This is also the case for conventional stepped transmissions that have a power interruption at each gear shift. There is, however, one important difference. At a power interruption, the engine speed can be controlled in order to synchronize parts to be engaged. This is a procedure used in automatic mechanically engaged transmissions (AMTS) that are common in heavy trucks and buses. In a dual clutch transmission without power interruption, this is not possible. Instead, some synchronizing devices are required. A straightforward solution is to have every tooth clutch in the transmission designed as synchronizers, i.e., be equipped with synchronizing clutch elements, e.g., as in US2008/0188342A1. That would imply high costs and power losses, though.

Basically, only two synchronizing devices are required; one that can make the speed of the first sub-transmission larger than that of the second sub-transmission, and one that can make the speed of the first sub-transmission less than that of the second. That will work when the first sub-transmission is idling and the second is active, as well as when the first sub-transmission is active and the second is idling. This can be referred to as a central synchronizing unit. A lucid example thereof is shown in GB2110324A.

A central synchronizing unit in a dual clutch transmission can be of a very simple design. This normally requires, however, that shifts without power interruption are performed between consecutive gears, only. Furthermore, the speed ratio steps between consecutive gears should be fairly equal. For heavy on- and off road vehicles, in combination with a range section, e.g., as in US2008/0188342A1, this is plausible. In U.S. Pat. No. 4,876,907 a central synchronizing unit 30 makes use of a gearwheel 13 that is used for power transfer. Then, only three additional gearwheels, 32, 33 and 39 are required for the synchronizing function. These gearwheels only need to carry the loads at synchronizing, and can be considerably narrower than the power transferring gearwheels. The central synchronizing unit can, hence, be made very compact, especially in axial extension, and cost-effective.

Tooth clutches that do not have any synchronizing clutch elements can be referred to as unsynchronized tooth clutches. Special care is required for transmissions with un-synchronized tooth clutches. A case with operating engine and the vehicle at standstill can be considered. Shafts and gearwheels that are drivingly connected to the output of the transmission, and hence to the driven wheels, will not rotate. Other parts of the transmission are drivingly engaged to the engine, e.g., for driving a power take-off unit, and rotate. Now, if the vehicle is to be driven, the engine and the power take-off unit need to be disengaged, and a start-off gear needs to be engaged in the transmission. If the tooth clutch that corresponds to the start-off gear is unsynchronized, it cannot be engaged until the speed of the rotating parts is low enough. With no special means therefore, that may take several seconds, which hardly is acceptable. Thence, transmissions with unsynchronized tooth clutches often have a shaft brake that can selectably reduce the speed of rotating parts. Examples can be seen in U.S. Pat. No. 3,309,934, DE19652916A1, U.S. Pat. No. 5,988,344, US2003/0168300A1, WO2004/069621A1, U.S. Pat. No. 7,000,748B2, SE527267C2, WO2008/094122A1, WO2008/105728A1, and for a dual clutch transmission, DE3739898A1. A shaft brake normally acts on a shaft or on a gearwheel drivingly connected therewith.

In a dual clutch transmission, two shaft brakes could be used, one for each sub-transmission, in order to reduce the speed of rotating parts when the vehicle is at standstill. That would increase the costs, though.

A constraint with a central synchronizing unit is that it only enables shifts between consecutive gears. It would be of advantage if some multi-step gear shifts could be carried out, e.g., at rapid acceleration from low vehicle speed in steep downhill conditions.

Thus, it is desirable to present an improved multi-clutch transmission, where means are provided to facilitate i) engagement of gears when the vehicle is at standstill, and ii) multi-step powershifts, as well as being iii) compact, iv) powerful, and v) cost-efficient, and vi) having low power losses when not actuated. This is achieved by a multi-clutch transmission as discussed in the introduction, the characteristics of which are defined by claim 1.

The device according to an aspect of the present invention is a multi-clutch transmission for a motor vehicle with at least one prime mover, said multi-clutch transmission comprising frictional clutches drivingly connected to said prime mover, an output shaft, and a main transmission that comprises input shafts connected to said frictional clutches, a countershaft parallel to at least one of said input shafts, gearwheels and tooth clutches, where a first of said frictional clutches and a first subset of said tooth clutches are arranged to be selectively engaged in order to transfer power in a first set of gears between said prime mover and said output shaft, and where a second of said frictional clutches and a second subset of said tooth clutches are arranged to be selectively engaged in order to transfer power in a second set of gears between said prime mover and said output shaft, where said main transmission is arranged to, while transferring power in one of said second set of gears and having said first frictional clutch disengaged, being capable of having one of said first set of gears preselected, and of changing to have another of said first set of gears preselected, where said multi-clutch transmission is arranged to be capable of shifting from one of said second set of gears to one preselected of said first set of gears without interruption of the power transfer between said prime mover and said output shaft, characterized in that a shaft brake unit is arranged to be selectively activated in order to exert torque that tends to reduce the rotational speed of one of said input shafts, and a central synchronizing unit is arranged to be selectively activated in order to make a first of said input shafts to rotate faster or slower than a second of said input shafts.

In another embodiment according to the invention said shaft brake unit and said central synchronizing unit are further arranged to be simultaneously activated in order to reduce the speeds of rotating parts in said main transmission prior to the engagement of tooth clutches when said output shaft is not rotating.

In a further embodiment according to the invention said shaft brake unit is a countershaft brake unit arranged to brake said countershaft and one of said input shafts via two of said gearwheels, where one of said gearwheels is arranged rotationally fixed to said countershaft and the other of said gearwheels is arranged rotationally fixed to one of said input shafts and where said two gearwheels are in mesh.

In another embodiment according to the invention said shaft brake unit is an input shaft brake unit arranged to brake one of said input shafts directly by braking interaction between a first element rotationally fixed to or integrated with said input shaft and a second element fixed to or integrated with a multi-clutch transmission housing.

In yet another embodiment according to the invention said input shaft brake unit is arranged to be used when performing a multi-step power shift.

In a further embodiment according to the invention said main transmission is arranged to perform said multi-step power shift from a low gear, which is a gear in said second set of gears, to a higher gear, which is a gear in said first set of gears of said input shaft, which said input shaft brake is arranged to brake, and in order to be able to engage said higher gear said input shaft brake is arranged to decrease the rotational speed of said input shaft to a level that corresponds to the gear that is to be preselected of said first set of gears.

In a further embodiment of the above mentioned embodiment said input shaft brake is arranged to decrease rotational speed of said input shaft to that of said main shaft, upon which said input shaft is arranged to be drivingly connected directly to said main shaft by one of said tooth clutches in said first set of gears.

In a further embodiment of one of the above four latest mentioned embodiments said first element is an input shaft synchronizing gearwheel and said second element is a brake pad.

In a further embodiment of the above first mentioned embodiment said shaft brake unit is arranged to be activated prior to the preselection of a third of said first set of gears while transferring power in a first of said second set of gears in order to facilitate a multi-step power shift.

In a further embodiment of the above mentioned embodiment there is a second of said first set of gears whose speed ratio is between the speed ratios of said third of said first set of gears and said first of said second set of gears, and which second of said first set of gears is skipped when said multi-step power shift is performed.

In a further embodiment of the above mentioned embodiment one of said gearwheels transfers power in one of said first set of gears and in one of said second set of gears, and zero power is transferred via said one of said gearwheels in said third of said first set of gears and in said first of said second set of gears.

In a further embodiment of one of the above three latest mentioned embodiments two of said gearwheels are in mesh and transfer power in a low of said first set of gears and in a low of said second set of gears, where the speed reduction ratio of said low of said first set of gears is larger than that of said low of said second set of gears.

In a further embodiment according to the invention said central synchronizing unit is arranged to be selectively activated in order to make a first of said input shafts to rotate corresponding to less than two gear steps faster or slower than a second of said input shafts.

In a further embodiment according to the invention said multi-clutch transmission is a dual clutch transmission.

Further advantageous embodiments of the invention emerge from the following.

BRIEF DESCRIPTION OF THE DRAWINGS

The present invention will be described in greater detail below with reference to the accompanying drawings which, for the purpose of exemplification, shows further preferred embodiments of the invention and also the technical background, and in which.

DESCRIPTION OF THE INVENTION

Figure 1:
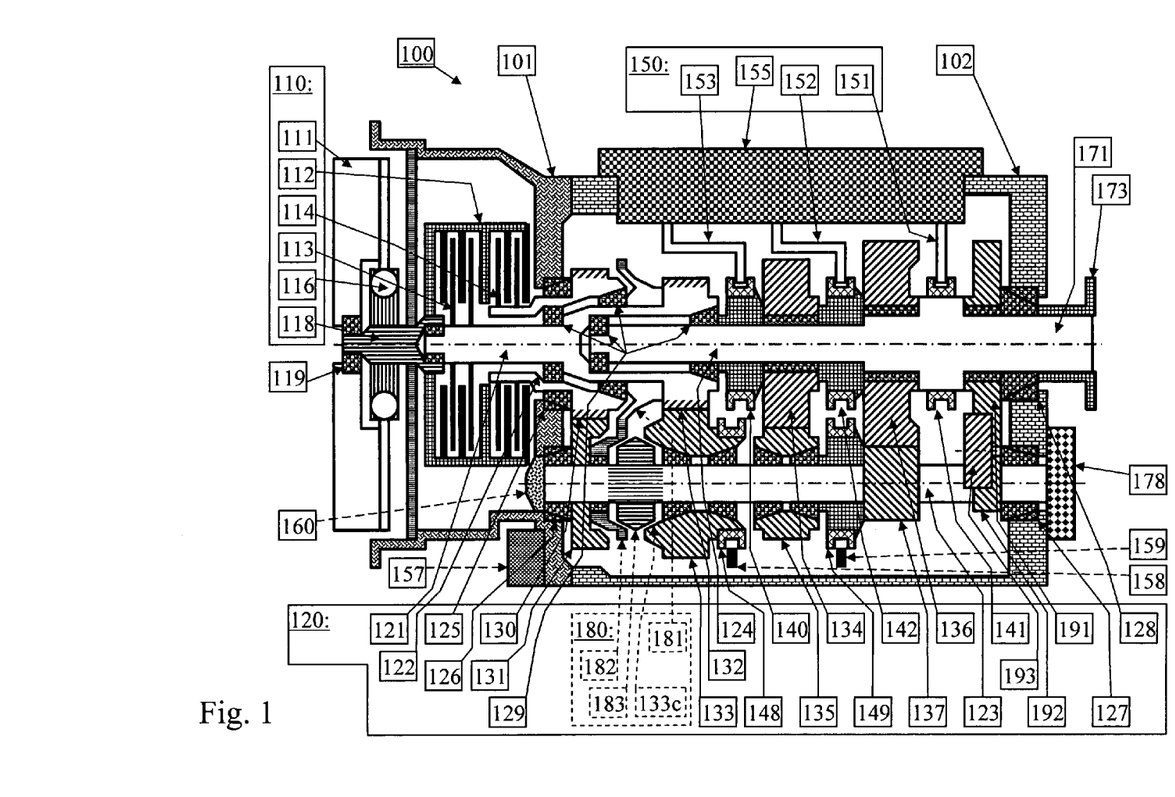
FIGS. 1 and 2 schematically show a stepped automatic mechanically engaged dual clutch transmission (DCT) according to two embodiments of the invention.

FIG. 1 shows schematically a longitudinal section of a dual clutch transmission 100. The transmission 100 comprises two housing parts; a clutch housing 101 and a main housing 102 (or multi-clutch transmission housing). In the clutch housing 101 a dual frictional clutch 110 is arranged, comprising the flywheel 111, a torsional damper 116 bolted thereon, a clutch input shaft 118, and a dual clutch assembly 112 with a first clutch disc set 113 and a second clutch disc set 114. There is also an actuator device (not shown) to control the dual friction clutch 110. The flywheel 111 is attached to the engine crankshaft (not shown).

A main transmission 120 is arranged inside the main housing 102. There are two input shafts; a first input shaft 121 and a second input shaft 122. The first input shaft 121 can be rotationally driven by the first clutch disc set 113. Similarly, the second input shaft 122 can be rotationally driven by the second clutch disc set 114.

First primary gear teeth 132 are integral with the first input shaft 121. Second primary gear teeth 130 are integral with the second input shaft 122. A main shaft 124 is coaxial with the input shafts 121 and 122. A countershaft 123 is parallel thereto. The second input shaft 122 is suspended in the clutch housing 101 by an input shaft bearing 125. Between the main shaft 124, first input shaft 121 and second input shaft 122, four pilot bearings 129 are arranged. The main shaft 124 is suspended in the main housing by a main shaft bearing 128. Thus, a thorough but not over-constrained suspension of the main and input shafts is achieved.

The main shaft 124 carries three loose gearwheels; the second secondary loose gearwheel 134, first secondary loose gearwheel 136 and reverse secondary loose gearwheel 191. The first and reverse secondary loose gearwheels 136 and 191 can be rotationally locked to the main shaft 124 by a first/reverse tooth clutch 141. The second secondary loose gearwheel 134 can be rotationally locked to the main shaft 124 by a second tooth clutch 142. Finally, the main shaft 124 can be rotationally locked to the first input shaft 121 by a direct tooth clutch 140.

On the countershaft 123 a second primary gearwheel 131 is rotationally fixed. It meshes with the second primary gear teeth 130 of the second input shaft 122. A primary countershaft loose gearwheel 133 meshes with the first primary gear teeth 132 of the first input shaft 121. A secondary countershaft loose gearwheel 135 meshes with second secondary loose gearwheel 134 on the main shaft 124. Furthermore, a first secondary gearwheel 137, which is integral with the countershaft 123, is meshing with the first secondary loose gearwheel 136 on the main shaft 124. Finally, a reverse secondary gearwheel 192 is integral with the countershaft 123 and drivingly connected with the reverse secondary loose gearwheel 191 via a reverse idler gearwheel 193. The primary countershaft loose gearwheel 133 can selectively be rotationally locked to the secondary countershaft loose gearwheel 135 by a first countershaft tooth clutch 148. The secondary countershaft loose gearwheel 135 can selectively be rotationally locked to the countershaft 123 by a second countershaft tooth clutch 149.

An output shaft 171 is integral with the main shaft 124. A companion flange 173 is rotationally fixed thereon and is the interface to a not shown propeller shaft.

The automatic or semi-automatic gear shift is carried out by a gear-shift control unit 150. This gear-shift control unit 150 comprises a gear-shift control housing 155, a direct shift fork 153, a second shift fork 152 and a first/reverse shift fork 151. The direct shift fork 153 controls the direct tooth clutch 140. The second shift fork 152 controls the second tooth clutch 142, and the first/reverse shift fork 151 controls the first reverse tooth clutch 141.

The gear-shift control unit 150 will not be described in detail here. Its structural part, the gear-shift control housing 155, may be machined from a cast blank and is bolted to the main housing 102. Therein, microcontrollers, sensors, valves, and actuators may be found. The shift forks 151, 152 and 153 may be carried by shift rods that connect to actuators. Other configurations are possible; any of the shift forks 151, 152 and 153 may or may not be a part of the gear-shift control unit 150. Furthermore, the gear-shift control unit 150 may be composed of different parts that are arranged at different locations of the transmission 100.

The countershaft tooth clutches 148 and 149 are controlled by a first countershaft shift fork 158 and a second countershaft shift fork 159. The shift forks 158 and 159 are actuated via shift rods (not shown) schematically by a countershaft actuator 157.

An optional power take-off drive unit 178 is bolted to the main housing 102 and rotationally connected to the countershaft 123. The power take-off drive unit 178 may drive, e.g., pumps, compressors and electric machines (not shown). It is not shown in detail, but may comprise housing parts, bearings, shafts, clutches and control parts for engagement and disengagement, gearings, and output flanges, as is readily known by a person skilled in the art.

According to the invention a shaft brake 160 is arranged to brake the rotational speed of one of an input shaft or a countershaft of said dual clutch transmission 100 and a central synchronizing unit 180 is arranged in said dual clutch transmission 100.

The shaft brake that brakes a countershaft is disclosed in FIG. 1. A countershaft brake 160 is schematically arranged between the left end of the countershaft 123 and the clutch housing 101. It can selectively reduce the rotational speed of the countershaft 123, which is essential for fast engagement of tooth clutches.

A central synchronizing unit 180 is located between the second primary gearwheel 131, second input shaft 122, first input shaft 121, and primary countershaft loose gearwheel 133. The central synchronizing unit 180 comprises an input shaft synchronizing gearwheel 181, a countershaft synchronizing loose gearwheel 182, a countershaft synchronizing twin cone 183, and an internal conical surface 133c on the primary countershaft loose gearwheel 133. The input shaft synchronizing gearwheel 181 is rotationally fixed with the first input shaft 121. The countershaft synchronizing loose gearwheel 182 is rotatably arranged on the countershaft 123. The countershaft synchronizing twin cone 183 is rotationally fixed with, but axially moveable on, the countershaft 123.

By axial displacement of the countershaft synchronizing twin cone 183, either of its external conical surfaces will mate with internal conical surfaces on the countershaft synchronizing loose gearwheel 182 or primary countershaft loose gearwheel 133. A frictional torque will then arise that tends to reduce the relative speed between the conical surfaces in contact.

The input shaft synchronizing gearwheel 181 has a larger pitch diameter than the second primary gear teeth 130 (on the second input shaft 122), whose pitch diameter, in turn, is larger than that of the first primary gear teeth 132 of the first input shaft 121. Correspondingly, the pitch diameter is smaller for the countershaft synchronizing loose gearwheel 182 than for the second primary gearwheel 131 and primary countershaft loose gearwheel 133. Thus, by axially displacing the countershaft synchronizing twin cone 183 to the right in FIG. 1, the rotational speed of the primary countershaft loose gearwheel 133 can be made equal to that of the countershaft 123. The rotational speed of the first input shaft 121 will then be larger than that of the second input shaft 122, due to the smaller pitch diameter of the first primary gear teeth 132. Similarly, axial displacement of the countershaft synchronizing twin cone 183 to the left can make the speeds of the countershaft synchronizing loose gearwheel 182 and countershaft 123 equal. Then, the first input shaft 121 will rotate slower than the second input shaft 122, due to the large diameter of the input shaft synchronizing gearwheel 181.

As mentioned the countershaft brake 160 can selectively reduce the rotational speed of the second input shaft 122 and all parts drivingly connected therewith. In a further embodiment of the invention this can be combined with the central synchronizing unit 180, where the first input shaft 121, too, can be decelerated along with parts drivingly connected therewith, since the input shaft synchronizing gearwheel 181 meshes with the countershaft synchronizing loose gearwheel 182. Thus, the rotating parts can be slowed down for reducing the speed difference in tooth clutches to facilitate engagement with the vehicle at standstill, e.g., after power take-off operation.

The main transmission 120 has six forward gears where high power transfer to the driven wheels is enabled during shifts between consecutive gears. There are two reverse gears which can be shifted between without interruption of power transfer. The function is described in FIGS. 1 and 2 in DE3131156A1. The tooth clutches 140, 141, 142, 148 and 149 do not need to be equipped with synchronizing parts in order to facilitate engagement. As discussed earlier, this reduces the costs and power losses. Furthermore, this allows the tooth clutches 140,148 and 142,149 to be axially overlapping without compromising the synchronizing performance due to limited radial extension. However, the central synchronizing unit 180 itself only enables consecutive, one-step powershifts to the nearest higher or lower gear. It can be shown that the countershaft brake 160 can unfortunately not be used at the preselection of gears for multi-step powershifts in the very compact main transmission 120. So, it would be of advantage if the transmission 100 could be modified to also enable multi-step shifts without power interruption. Preferably, such a modification should have minimum impact on the appealing features of the transmission 100 in terms of function and size.

Figure 2:
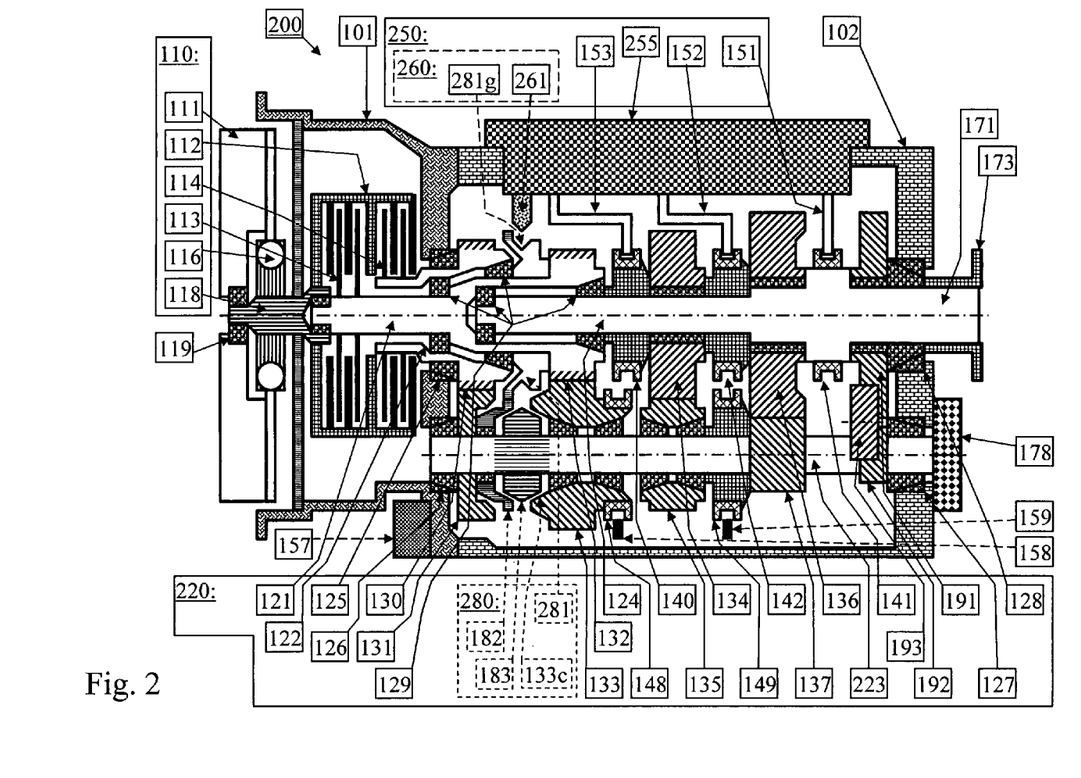

In FIG. 2, a transmission 200 according to another embodiment of the invention is shown that also comprises a shaft brake 260 which, compared to the embodiment of FIG. 1, is arranged to directly brake the rotational speed of a first input shaft 121 of a dual clutch transmission 200. A central synchronizing unit 280 is arranged in said dual clutch transmission 200 in a similar way as in FIG. 1. Several parts in FIG. 2 are, or could be, identical to parts in FIG. 1. Those parts are referred to by the same numbers. Corresponding but not identical parts have the same numbers except for the initial digit (½).

Thus, an input shaft brake 260 replaces said countershaft brake 160. The input shaft brake 260 is schematically shown as a brake pad 261 that can selectively be brought in contact with a mating brake groove 281g in a modified input shaft synchronizing gearwheel 281 (on the first input shaft 121) of a modified central synchronizing unit 280. The large diameter of the input shaft synchronizing gearwheel 281 increases the braking torque. The input shaft brake 260 is actuated (or activated) by a not shown actuator that is integrated with, or fixed to, a modified gear-shift control housing 255 of a modified gear-shift control unit 250. Other configurations are possible; the brake pad 261 and its actuator could be physically separate from the gear-shift control unit 250, for instance attached to the transmission housing 101,102.

The input shaft brake 260 can selectively reduce the rotational speed of the first input shaft 121 and all parts drivingly connected therewith. Combined with the central synchronizing unit 280, the countershaft 223, too, can be decelerated along with parts drivingly connected therewith, since the modified input shaft synchronizing gearwheel 281 meshes with the countershaft synchronizing loose gearwheel 182. Thus, the rotating parts can be slowed down for reducing the speed difference in tooth clutches to facilitate engagement with the vehicle at standstill, e.g., after power take-off operation.

By acting on the first input shaft 121, the input shaft brake 260 can, according to a father embodiment of the invention, be used also to facilitate the preselection at one important multi-step power shift; in shown example from second gear into fifth. In order to explain how this can be carried out, the transmission 200 will be studied when operated in second gear. Then, the first/reverse tooth clutch 141 is engaged to the left in FIG. 2, thereby rotationally locking the first secondary loose gearwheel 136 and main shaft 124. Power is then transferred in the sub-transmission of the second input shaft 122, via the second primary gearwheel 131, countershaft 223, first secondary gearwheel 137, first secondary loose gearwheel 136, and main shaft 124 to the output shaft 171. The sub-transmission of the first input shaft 121 can be preselected for the first gear. Then, the first and second countershaft tooth clutches 148, 149 are both engaged. It can also be preselected for the third gear, where the first countershaft tooth clutch 148 and second tooth clutch 142 are engaged. In any case, fifth gear can be preselected in the following way. First, the first countershaft tooth clutch 148 is disengaged. Then, the input shaft brake 260 is applied to reduce the rotational speed of the first inputshaft 121 to that of the main shaft 124. Finally, the direct tooth clutch 140 is engaged.

When the fifth gear has been preselected in the sub-transmission of the first input shaft 121, a multi-step powershift can be carried out by simultaneously disengaging the second clutch disc set 114 and engaging the first clutch disc set 113. Then, in fifth gear the power is led directly from the first input shaft 121 to the main shaft 124 and output shaft 171. Thus, by means of the input shaft brake 260, a powershift from second to fifth gear is made possible.

In FIG. 2, the input shaft brake 260 acts on the sub-transmission of the first input shaft 121 that is active on odd gears. In FIG. 1, the countershaft brake 160 acts on the sub-transmission of the second input shaft 122, which transfers power on even gears. The input shaft brake 260 can be used for preselection of gears for a multi-step upshift without power interruption, whereas the countershaft brake 160 cannot. This is due to a feature in the compact main transmissions 120 and 220; several gearwheels are used for power transfer in gears of both sub-transmissions. For instance, the secondary countershaft loose gearwheel 135 transfers power in first and third gears as well as in fourth and sixth gear. If driving in first gear, this gearwheel is "occupied", and its speed cannot be changed in order to facilitate a preselection of fourth gear. Similarly, when third gear is active, sixth gear cannot be preselected. Hence, the countershaft brake 160 cannot be used for preselection of gears for a multi-step powershift.

However, as described above, when driving in second gear, fifth gear can be preselected with the aid of the input shaft brake 260. This difference can be explained in the following way. In second gear, the gearwheels 130, 131, 137 and 136 are transferring power. In fifth gear, power is transferred by gearwheel 132, only, and not via its gear teeth but axially, from the clutch-side end of the first input shaft 121 to the direct tooth clutch 140. Hence, there are no gearwheels that transfer power in both fifth and second gear. That makes it possible to adjust the speed of the sub-transmission of the first input shaft 121 to preselect fifth gear while driving in second gear. With a speed-increasing device, e.g., as in DE3739898A1, the opposite would be possible, too; preselect second gear while driving in fifth gear.

So, the shaft brake has been relocated from acting on the sub-transmission of the second input shaft 122 (countershaft 123, FIG. 1) to the first input shaft 121 (FIG. 2). This relocation has enabled the use of the input shaft brake 260 at the preselection for a multi-step powershift.

Characterizing for the invention according to the embodiment in FIG. 2 is that a shaft brake can be used at the preselection for a multi-step powershift in a dual clutch transmission with the following features:

A central synchronizing unit facilitates the preselection of adjacent gears (single-step shifts).

The shaft brake acts on a rotating part of the sub-transmission of the gear to be preselected.

There is at least one gearwheel that transfers power in gears in two sub-transmissions.

No gearwheel transfers power in both the gear to be preselected and the gear in current use.

Figures 3, 4:
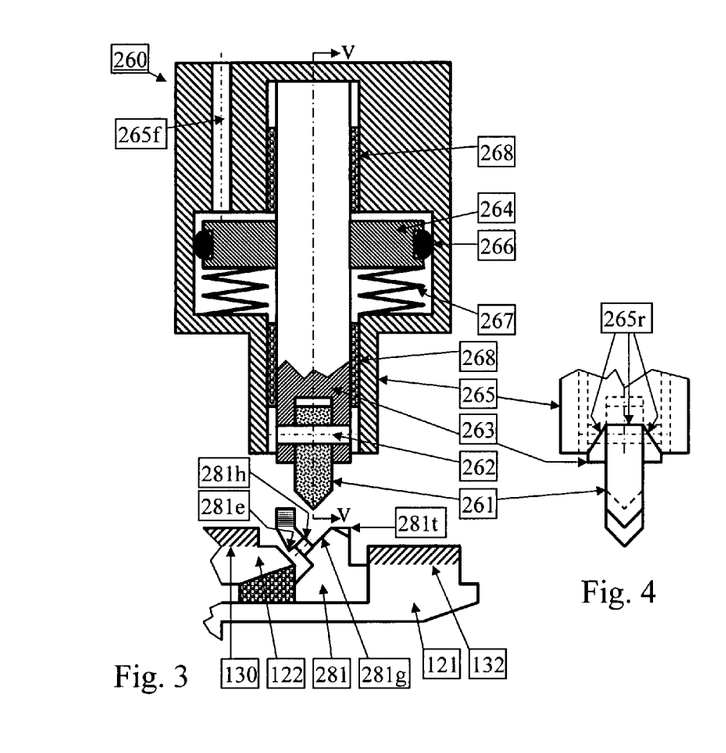
FIGS. 3 to 5 schematically shows details of the shaft brake in FIG. 2.
Figure 5:
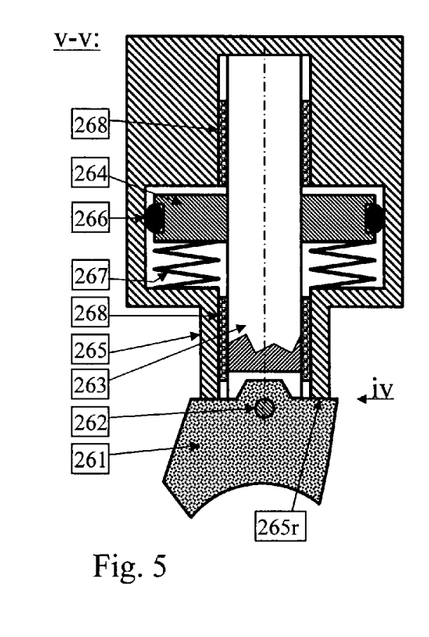

In the main transmission 220 in FIG. 2, the meshing gearwheel pair 136,137 transfers power in first gear as well as second gear. Similarly, the meshing gearwheel pair 134,135 transfers power in third and fourth gear. Here, the first and third gears are part of the sub-transmission of the first input shaft 121. Hence, in these meshing gearwheel pairs, the lower gear (with the highest speed reduction ratio), i.e., the first and third gears, respectively, are part of the sub-transmission that the input shaft brake 260 acts on. Then, the condition for enabling a shaft brake aided preselection for a multi-step powershift can be reformulated: The shaft brake shall act on the sub-transmission of the lower gear that uses the meshing gearwheel pair for power transfer. The shaft brake can then facilitate the preselection for a higher gear of that sub-transmission when driving in the higher gear that uses the meshing gearwheel pair. FIGS. 3 to 5 show schematically an embodiment of the input shaft brake 260. The brake pad 261 is hinged by a pin 262 in a piston rod 263. A piston 264 is fixed to the piston rod 263 and arranged inside a brake actuator housing 265. Valve means (not shown) selectively control pressurized fluid via a fluid inlet channel 265f to act on the piston 264. Sealing means 266 seal off the upper side of the piston 264 from the lower. Hence, by entering pressurized fluid via the fluid inlet channel 265f, the piston 264, piston rod 263 and brake pad 261 can be pushed downwards. The brake pad 261 will then engage with the brake groove 281g in the input shaft synchronizing gearwheel 281. Friction forces will arise, reducing the rotational speed of the first input shaft 121. When the fluid pressure on the upper side of the piston 264 is released, the piston rod 263 is pushed up by a return spring 267, and the brake pad 261 is disengaged from the brake groove 281g. The piston rod 263 is supported by bearing means 268. A set of teeth 281t can be used for sensing the speed of the first input shaft 121. As an alternative, the ordinary gear teeth of the input shaft synchronizing gearwheel 281 can be used.

FIG. 5 shows a cross section along "v-v" in FIG. 3. FIG. 4 shows a view of arrow "iv" in FIG. 5 of the brake pad 261 and lower part of brake actuator housing 265. There is a recess 265r in the brake actuator housing 265. When being pushed back by the return spring 267, the brake pad 261 will be guided by the recess 265r, both about the centre of the piston rod 263 and about the pin 262. This will give a well-defined disengaged position and orientation of the brake pad 261, assuring clearance to the brake groove 281g. The brake pad 261 is preferably asymmetric in peripheral direction of the input shafts, as in FIG. 5. This gives even contact pressure and wear of the friction material, as well as increased braking action by so-called self-energizing or servo effect. An edge 281e and holes 281h catch oil flow from inside the input shafts 121,122 and direct it to the brake groove 281g and brake pad 261 for cooling.

Thus, the input shaft brake 260 can be used to i) facilitate engagement of gears (along with the central synchronizing unit 280) when the vehicle is at standstill, and to ii) facilitate preselection for a multi-step powershift. Furthermore, it is iii) very compact, using very little space in axial direction. By wedging action in the brake groove 281g and self-energizing action, it is iv) powerful. The simple design and low number of parts make it v) cost-efficient. Finally, when not actuated, it has vi) low power losses since the brake pad 261 is guided by the recess 265r. Hence, the input shaft brake 260 can potentially fulfil the scope of the invention.

The input shaft brake 260 acting on the sub-transmission of the first input shaft 121 may be regarded as a key feature of the invention. That enables the preselection for a multi-step powershift, while, along with the central synchronizing unit 280, still being able to facilitate the engagement of gears when the vehicle is at standstill (where the last mentioned functionality also can be performed by the embodiment of FIG. 1).

Friction material, e.g., organic, carbon-based, molybdenum or bronze, can be applied on any of the mating friction surfaces, preferably on the small contact surfaces of the brake pad 261. The friction material may be attached to a carrying structure in any of several ways, e.g., bonding, welding, sintering and plasma spraying, as known to a person skilled in the art.

The invention has been described with a certain degree of particularity. However, several variations and modifications are possible within what is covered by the claims, as will be apparent to persons skilled in the art. For instance, the main transmission 220 or 120 could be combined with a range section, as in US2008/0188342A1 and U.S. Pat. No. 6,958, 028B2.

The main transmission 220 or 120 could be substituted by any other dual clutch transmission with a countershaft, e.g., as in U.S. Pat. No. 4,876,907. Other arrangements and locations of friction clutches are possible, e.g., as in U.S. Pat. No. 5,347,879 or U.S. Pat. No. 4,777,837. Designs with three friction clutches, or more, DE4226577C1 or US2008/ 0190228A1 can be included. Powershifting transmissions with more than one friction clutch are referred to as multi-clutch transmissions.

Another suggested solution which lies outside the scope of the above described invention is to actuate both devices in a central synchronizing unit simultaneously. Besides increasing the complexity, size and cost of the central synchronizing unit, this would put very high thermal loads on the friction surfaces therein.

The invention claimed is:

1. A multi-clutch transmission for a motor vehicle with at least one prime mover, the multi-clutch transmission comprising
frictional clutches drivingly connected to the prime mover,
an output shaft,
a main transmission that comprises input shafts connected to the frictional clutches,
a countershaft parallel to at least one of the input shafts,
gearwheels and tooth clutches, where a first of the frictional clutches and a first subset of the tooth clutches are arranged to be selectively engaged in order to transfer power in a first set of gears between the prime mover and the output shaft, and where a second of the frictional clutches and a second subset of the tooth clutches are arranged to be selectively engaged in order to transfer power in a second set of gears between the prime mover and the output shaft, where the main transmission is arranged to, while transferring power in one of the second set of gears and having the first frictional clutch disengaged, being capable of having one of the first set of gears preselected, and of changing to have another of the first set of gears preselected, where the multi-clutch transmission is arranged to be capable of shifting from one of the second set of gears to one preselected of the first set of gears without interruption of the power transfer between the prime mover and the output shaft, and where a shaft brake unit is arranged to be selectively activated in order to exert torque that tends to reduce the rotational speed of one of the input shafts, and a central synchronizing unit is arranged to be selectively activated in order to make a first of the input shafts to rotate faster or slower than a second of the input shafts, wherein the shaft brake unit and the central synchronizing unit are further arranged to be simultaneously activated in order to reduce the speeds of rotating parts in the main transmission prior to the engagement of tooth clutches when the output shaft is not rotating.

2. A multi-clutch transmission as in claim 1, wherein the shaft brake unit is a countershaft brake unit arranged to brake the countershaft and one of the input shafts via two of the gearwheels, where one of the gearwheels is arranged rotationally fixed to the countershaft and the other of the gearwheels is arranged rotationally fixed to one of the input shafts and where the two gearwheels are in mesh.

3. A multi-clutch transmission as in claim 1, wherein the shaft brake unit is an input shaft brake unit arranged to brake one of the input shafts directly by braking interaction between a first element rotationally fixed to or integrated with the input shaft and a second element fixed to or integrated with a multi-clutch transmission housing.

4. A multi-clutch transmission as in claim 3, wherein the input shaft brake unit is arranged to be used when performing a multi-step power shift.

5. A multi-clutch transmission as in claim 4, wherein the main transmission is arranged to perform the multi-step power shift from a low gear, which is a gear in the second set of gears, to a higher gear, which is a gear in the first set of gears of the input shaft, which the input shaft brake is arranged to brake, and in order to be able to engage the higher gear the input shaft brake is arranged to decrease the rotational speed of the input shaft to a level that corresponds to the gear that is to be preselected of the first set of gears.

6. A multi-clutch transmission as in claim 5, wherein the input shaft brake is arranged to decrease rotational speed of the input shaft to that of the main shaft, upon which the input shaft is arranged to be drivingly connected directly to the main shaft by one of the tooth clutches in the first set of gears.

7. A multi-clutch transmission as in claim 3, wherein the first element is an input shaft synchronizing gearwheel and the second element is a brake pad.

8. A multi-clutch transmission as in claim 1, wherein the multi-clutch transmission is a dual clutch transmission.

9. A multi-clutch transmission for a motor vehicle with at least one prime mover, the multi-clutch transmission comprising frictional clutches drivingly connected to the prime mover, an output shaft, and a main transmission that comprises input shafts connected to the frictional clutches, a countershaft parallel to at least one of the input shafts, gearwheels and tooth clutches, where a first of the frictional clutches and a first subset of the tooth clutches are arranged to be selectively engaged in order to transfer power in a first set of gears between the prime mover and the output shaft, and where a second of the frictional clutches and a second subset of the tooth clutches are arranged to be selectively engaged in order to transfer power in a second set of gears between the prime mover and the output shaft, where the main transmission is arranged to, while transferring power in one of the second set of gears and having the first frictional clutch disengaged, being capable of having one of the first set of gears preselected, and of changing to have another of the first set of gears preselected, where the multi-clutch transmission is arranged to be capable of shifting from one of the second set of gears to one preselected of the first set of gears without interruption of the power transfer between the prime mover and the output shaft, and where a shaft brake unit is arranged to be selectively activated in order to exert torque that tends to reduce the rotational speed of one of the input shafts, and a central synchronizing unit is arranged to be selectively activated in order to make a first of the input shafts to rotate faster or slower than a second of the input shafts, wherein the central synchronizing unit is arranged to be selectively activated in order to make a first of the input shafts to rotate corresponding to less than two gear steps faster or slower than a second of the input shafts.

10. A multi-clutch transmission as in claim 9, wherein the shaft brake unit is a countershaft brake unit arranged to brake the countershaft and one of the input shafts via two of the gearwheels, where one of the gearwheels is arranged rotationally fixed to the countershaft and the other of the gearwheels is arranged rotationally fixed to one of the input shafts and where the two gearwheels are in mesh.

11. A multi-clutch transmission as in claim 9, wherein the shaft brake unit is an input shaft brake unit arranged to brake one of the input shafts directly by braking interaction between a first element rotationally fixed to or integrated with the input shaft and a second element fixed to or integrated with a multi-clutch transmission housing.

12. A multi-clutch transmission as in claim 11, wherein the input shaft brake unit is arranged to be used when performing a multi-step power shift.

13. A multi-clutch transmission as in claim 12, wherein the main transmission is arranged to perform the multi-step power shift from a low gear, which is a gear in the second set of gears, to a higher gear, which is a gear in the first set of gears of the input shaft, which the input shaft brake is arranged to brake, and in order to be able to engage the higher gear the input shaft brake is arranged to decrease the rotational speed of the input shaft to a level that corresponds to the gear that is to be preselected of the first set of gears.

14. A multi-clutch transmission as in claim 13, wherein the input shaft brake is arranged to decrease rotational speed of the input shaft to that of the main shaft, upon which the input shaft is arranged to be drivingly connected directly to the main shaft by one of the tooth clutches in the first set of gears.

15. A multi-clutch transmission as in claim 11, wherein the first element is an input shaft synchronizing gearwheel and the second element is a brake pad.

16. A multi-clutch transmission as in claim 9, wherein the multi-clutch transmission is a dual clutch transmission.

17. A multi-clutch transmission for a motor vehicle with at least one prime mover, the multi-clutch transmission comprising frictional clutches drivingly connected to the prime mover, an output shaft, and a main transmission that comprises input shafts connected to the frictional clutches, a countershaft parallel to at least one of the input shafts, gearwheels and tooth clutches, where a first of the frictional clutches and a first subset of the tooth clutches are arranged to be selectively engaged in order to transfer power in a first set of gears between the prime mover and the output shaft, and where a second of the frictional clutches and a second subset of the tooth clutches are arranged to be selectively engaged in order to transfer power in a second set of gears between the prime mover and the output shaft, where the main transmission is arranged to, while transferring power in one of the second set of gears and having the first frictional clutch disengaged, being capable of having, one of the first set of gears preselected, and of changing to have another of the first set of gears preselected, where the multi-clutch transmission is arranged to be capable of shifting from one of the second set of gears to one preselected of the first set of gears without interruption of the power transfer between the prime mover and the output shaft, and where a shaft brake unit is arranged to be selectively activated in order to exert torque that tends to reduce the rotational speed of one of the input shafts, and a central synchronizing unit is arranged to be selectively activated in order to make a first of the input shafts to rotate faster or slower than a second of the input shafts, wherein the shaft brake unit is arranged to be activated prior to the preselection of a third of the first set of gears while transferring power in a first of the second set of gears in order to facilitate a multi-step power shift.

18. A multi-clutch transmission as in claim 17, wherein there is a second of the first set of gears whose speed ratio is between the speed ratios of the third of the first set of gears and the first of the second set of gears, and which second of the first set of gears is skipped when the multi-step power shift is performed.

19. A multi-clutch transmission as in claim 18, wherein one of the gearwheels transfers power in one of the first set of gears and in one of the second set of gears, and zero power is transferred via the one of the gearwheels in the third of the first set of gears and in the first of the second set of gears.

20. A multi-clutch transmission as in claim 17, wherein two of the gearwheels are in mesh and transfer power in a low of the first set of gears and in a low of the second set of gears, where the speed reduction ratio of the low of the first set of gears is larger than that of the low of the second set of gears.

21. A multi-clutch transmission as in claim 17, wherein the multi-clutch transmission is a dual clutch transmission.

* * * * *

UNITED STATES PATENT AND TRADEMARK OFFICE
CERTIFICATE OF CORRECTION

PATENT NO.         : 8,752,442 B2
APPLICATION NO.    : 13/514609
DATED              : June 17, 2014
INVENTOR(S)        : Anders Hedman et al.

It is certified that error appears in the above-identified patent and that said Letters Patent is hereby corrected as shown below:

On the title page item (73) should be changed from "Volvo Lastvagner AB" to --Volvo Lastvagnar AB--.

Signed and Sealed this
Twelfth Day of August, 2014

Michelle K. Lee
*Deputy Director of the United States Patent and Trademark Office*